July 20, 1948.  C. W. LEGUILLON  2,445,677
APPARATUS FOR APPLYING PLASTIC MATERIALS TO BANDS
Filed March 21, 1944  2 Sheets—Sheet 1

Inventor
Charles W. Leguillon
By Willis F. Avery
Atty.

July 20, 1948. C. W. LEGUILLON 2,445,677
APPARATUS FOR APPLYING PLASTIC MATERIALS TO BANDS
Filed March 21, 1944 2 Sheets-Sheet 2
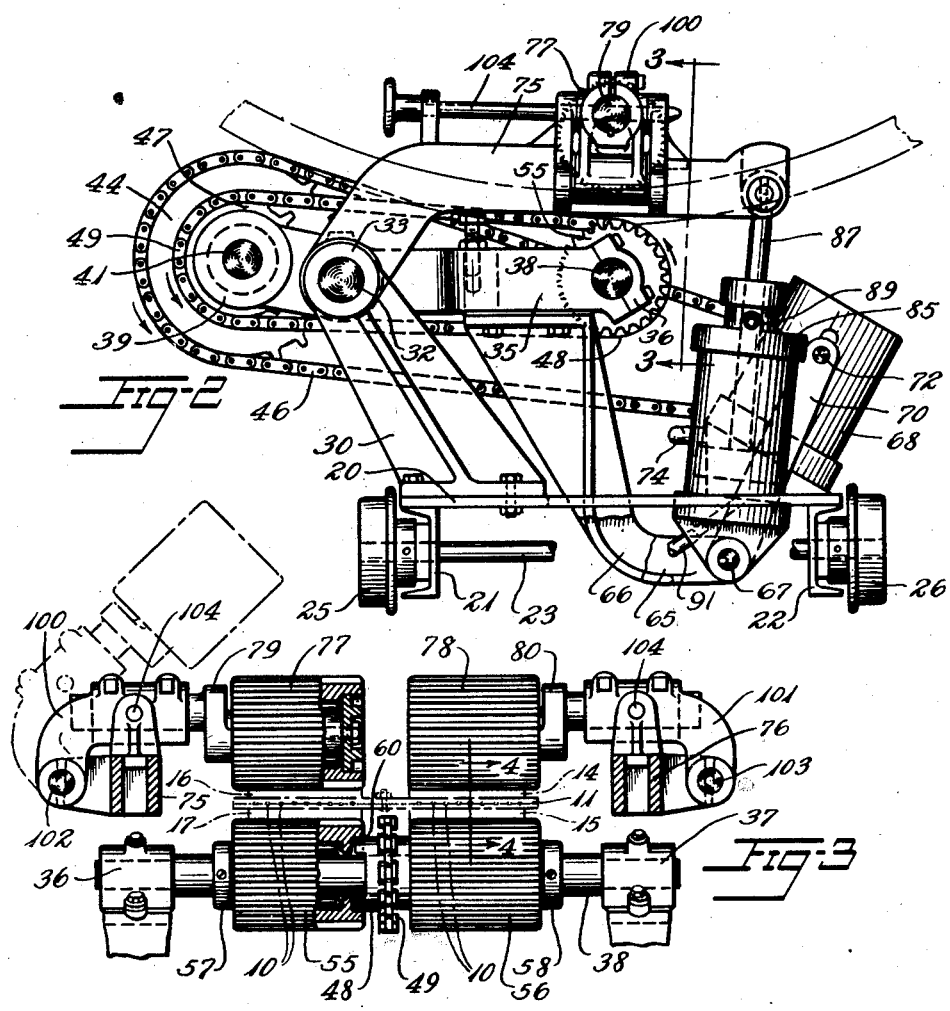
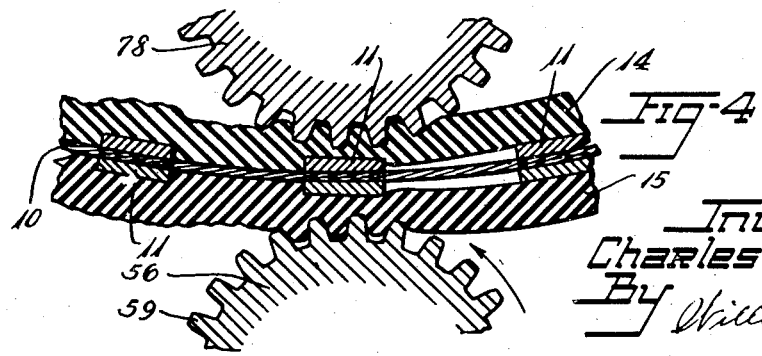
Inventor
Charles W. Leguillon
By Willis F. Avery
Atty.

Patented July 20, 1948

2,445,677

UNITED STATES PATENT OFFICE 2,445,677

APPARATUS FOR APPLYING PLASTIC MATERIAL TO BANDS

Charles W. Leguillon, Akron, Ohio, assignor to The B. F. Goodrich Company, New York, N. Y., a corporation of New York Application March 21, 1944, Serial No. 527,512

2 Claims. (Cl. 154—3)

This invention relates to the application of plastic material to bands and is especially useful in the application of plastic rubber-like material to the faces of flexible track bands.

In the manufacture of flexible band tracks for self-laying track-type vehicles rubber or other rubber-like material in plastic form has been applied to opposite faces of a band of flexible tension members and has been molded about the band of tension members during vulcanization. Difficulty has been experienced, especially where the bands have been of spaced-apart metal cables and longitudinally spaced apart cross bars of metal, in forming the plastic material closely about the cross-bars and cables, and in uniting the plastic material at opposite faces of the band about the cables and cross-bars and therebetween due to the thickness and stiffness of the slabs of plastic material, and, especially where the plastic material is of synthetic rubber or similar material, in permanently uniting the material at opposite faces of the band to each other.

Objects of the present invention are to provide deep kneading of the plastic material to work it into adhesive relation from opposite faces of the band, to provide a high degree of compacting pressure, to provide for progressively rolling the band, to provide for simultaneously rolling a plurality of slabs at opposite edges of the band, to provide for ready placement and removal of the band with relation to the apparatus, and to provide for shifting mechanism to facilitate this.

These and other objects will appear from the following description and the accompanying drawings.

Of the drawings:

Fig. 2 is a side elevation thereof, parts being broken away, the band being indicated in dot and dash lines.

Fig. 3 is a sectional view, taken on line 3—3 of Fig. 2, the band being indicated by dot and dash lines.

Fig. 4 is a sectional view, taken on line 4—4 of Fig. 3.

Figure 1:
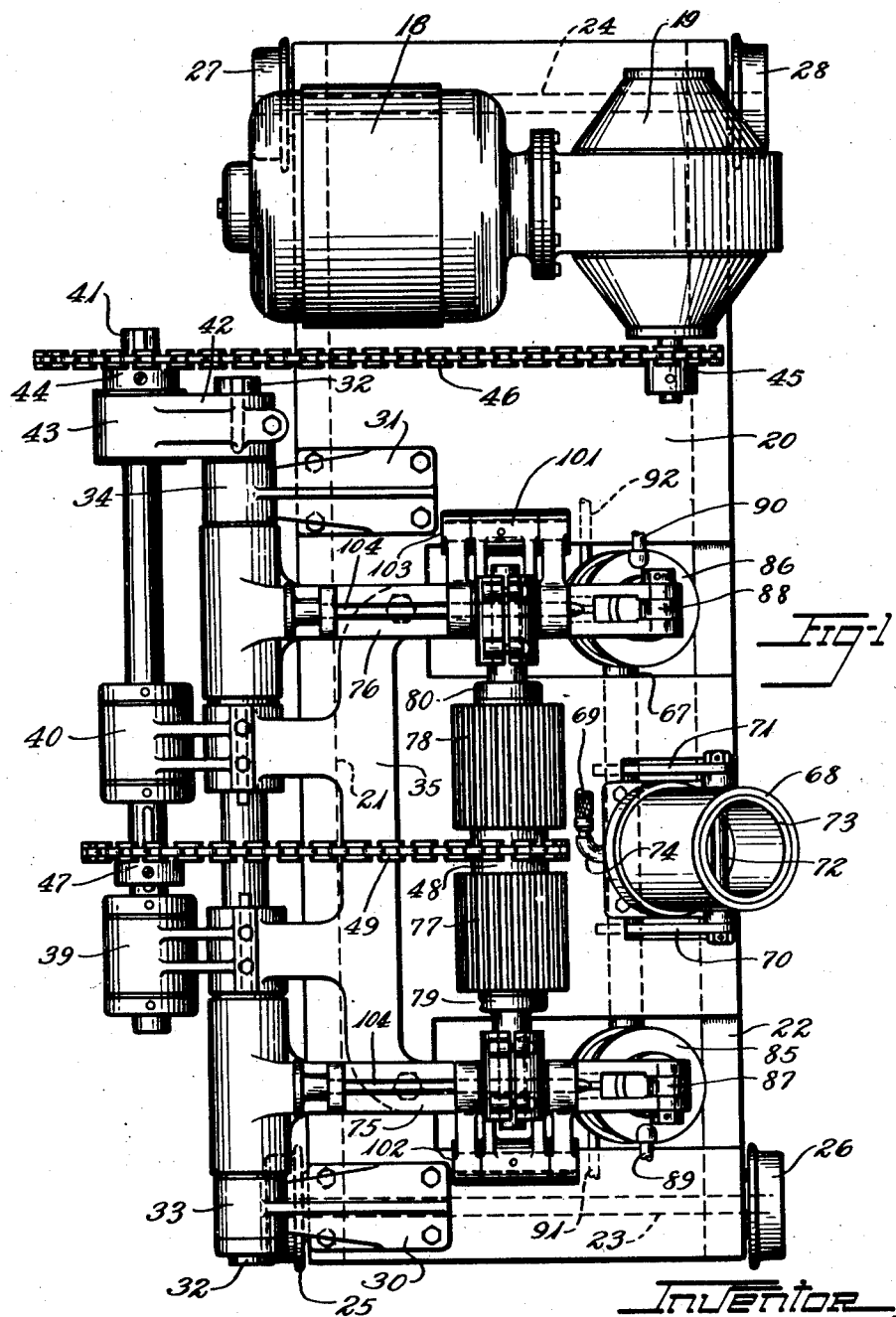
Fig. 1 is a plan view of apparatus constructed in accordance with and embodying the invention.

Referring to the drawings, the band is shown in longitudinal section in Fig. 4 and comprises parallel spaced apart tension members 10, such as metal cables, arranged in parallel laterally spaced-apart groups as in the Mayne Patent No. 2,107,490. The cables are held in spaced-apart relation by cross bars 11 arranged at intervals therealong. The space between the groups of cables is relatively wide as compared to the spaces between the cables of the groups to provide for driving the band by engagement of sprockets with the cross bars between the groups of cables. The cross bars also provide a convenient means for manipulating the band during application of rubber-like material about the cables, and where the bands are endless, portions of the cross bars between the groups of cables may be secured to a supporting wheel for rotation about an axis, leaving the portions of the cross bars which engage the cables extending laterally of the wheel where rubber or other rubber-like material in the form of slabs 14, 15, 16, 17, may be applied to the inner and outer faces of the bands of cables.

The apparatus shown in the drawings may be arranged to engage the rubber slabs while the band is supported with its rubber covered margins exposed, to work or knead the rubber-like material and force it to conform to the cables and bars. Its frame comprises a plate 20 mounted on parallel channel bars 21, 22, having bearings for a pair of axles 23, 24 having track wheels 25, 26, 27, 28 for supporting it from rails (not shown). This construction enables the apparatus to be moved bodily along a track into and out of operative position with relation to the band.

Brackets 30, 31, mounted on the frame, provide aligned bearings 33, 34 for a horizontal shaft 32. A forked lever 35 is keyed to shaft 32 and is formed with aligned clamp bearings 36, 37 on its parallel arms for non-rotatably supporting a shaft 38 parallel to shaft 32. The yoke is also formed with bearings 39, 40 for rotatably supporting a shaft 41, parallel to shaft 32.

An arm 42 is keyed to one end of shaft 32 and has a bearing 43 in alignment with bearings 39, 40 for rotatably supporting shaft 41. A motor 18 having a speed reducer 19, is mounted on plate 20. A sprocket 44 is fixed to shaft 41 and is driven by a sprocket 45 on the speed reducer, through a chain 46. A sprocket 47 is fixed to shaft 41 in position to drive a sprocket 48 rotatably journaled on shaft 38, a chain 49 providing the driving connection.

For compacting the rubber-like material on the under face of the band, a pair of rollers 55, 56 are rotatably journaled about shaft 38 between collars 57, 58 fixed to the shaft. Each roller is formed with axially extending ribs 59 or teeth spaced apart about its circumference and of considerable radial extent. These ribs are adapted to penetrate deeply into the rubber-like material and to knead and flow the material to force it into intimate engagement about the cables and the cross-bars by rolling action, and preferably are of depth approximating the thickness of the rubber-like material at one face of the cables.

The sprocket 48 has driving lugs 60 on its hub at each end thereof to engage in notches formed in the ends of rollers 55, 56 to drive the same.

For raising the rollers 55, 56 into contact with the band, a pair of depending brackets 65, 66 are fixed to the arms of yoked lever 35. A shaft 67 has its ends fixed in apertures of the brackets. A pressure fluid cylinder 68 is fixed to plate 20. Links 70, 71 have their lower ends pivotally engaging the shaft 67 and their upper ends pivotally engaging a cross pin 72 fixed to a piston 73 slidable in the cylinder 68. Slots through the wall of the cylinder 68 permit movement of the cross-pin lengthwise of the cylinder. A pipe 74 enters the lower end of the cylinder 68 and is connected to a source of fluid under pressure by a flexible hose 69. The arrangement is such that when fluid under pressure is admitted to the cylinder 68, the yoke 35 is raised to force the rollers 55, 56 against the band. A suitable valve (not shown) is provided to connect the cylinder 68 alternately with a fluid pressure source and to the atmosphere for raising and lowering the yoke 35.

For compacting the rubber-like material on the upper face of the band, a pair of arms 75, 76 are journaled on shaft 32. Each arm carries a toothed roller 77, 78, similar to rollers 55, 56. These rollers are freely rotatable about studs 79, 80 carried by the arms, and are spaced apart longitudinally to clear the wheel which supports the band.

For raising and lowering the arms, a pair of double-acting fluid pressure cylinders 85, 86 are pivotally mounted on the shaft 67. Their piston rods 87, 88 are pivotally connected to arms 75, 76 respectively. Pipes 89, 90 connect the upper ends of the cylinders by means of flexible hose to one port of a four way valve (not shown). Pipes 91, 92 connect the lower ends of the cylinders by means of flexible hose to the opposite port of the valve. One port of the valve is connected to a source of fluid under pressure and another port to the atmosphere. The arrangement is such that by reversing the valve, the arms 75, 76 may be raised or lowered.

To permit the upper rollers being moved out of the way to enter a band between the upper and lower rollers or to be removed therefrom, studs 79, 80 are mounted on moveable supports 100, 101 pivotally mounted on arms 75, 76 as at 102, 103 so as to swing toward and away from the band. Each stud is locked to its arm by a draw-pin 104 which extends through ears of the arm and engages through an opening in the support. The arrangement is such that when the pins are in place the studs 79, 80 are fixed to arms 75, 76 against relative movement, and with the pins removed, the studs with their rollers may be swung upwardly and outwardly as indicated by the dot and dash line position of Fig. 3.

With the band in place and the upper rollers locked to the arms as shown in Fig. 3, fluid under pressure is admitted to the upper ends of cylinders 85, 86 forcing the upper rolls downwardly and through pipe 74 to the lower end of cylinder 68 forcing the lower rolls upwardly against the rubber-like material at each margin of the band simultaneously. The lower rolls are power driven while the upper rolls are freely rotatable. The band is propelled between the sets of rolls which progressively knead or work the rubber-like material by deep penetration of their teeth in the material and consequent flow of the material under pressure so that the material from opposite sides of the band is thoroughly adhered together. Where the band is supported by a wheel, the wheel is permitted to turn freely on its axis and the spacing of the upper rolls from each other permits the wheel to pass therebetween. The band may be passed through between the rolls successively to cause the material to be thoroughly kneaded.

Variations may be made without departing from the scope of the invention as it is defined by the following claims.

I claim:

1. Apparatus for compacting plastic material about a band of tension members, said apparatus comprising roller means for supporting the band of tension members from one face thereof, roller means overhanging the margins of the opposite face of the band of tension members and engaging said margins in rolling relation thereto, the last said roller means comprising a pair of rollers, one for each margin of said band, means for adjusting said last-named roller means into and out of such overhanging relation by individual movement of each of said rollers to permit placement and removal of an endless band of tension members, roller-driving means for feeding the band of tension members between said roller means, and means for pressing said roller means against the plastic material at faces of the band.

2. Apparatus for compacting plastic rubber-like material about a track band of spaced-apart tension members and cross bars thereon, said apparatus comprising roller means for supporting the band of tension members from one face thereof, roller means overhanging the margins of the opposite face of the band of tension members and engaging said margins in rolling relation thereto, the last said roller means comprising a pair of rollers, one for each margin of said band, one of said roller means having compacting ribs for kneading the plastic material, means for adjusting said overhanging roller means into and out of such overhanging relation by individual movement of each of said rollers to permit placement and removal of an endless band, roller-driving means for feeding the band between said roller means, and means for pressing said roller means against the plastic material at faces of the band.

CHARLES W. LEGUILLON.

REFERENCES CITED

The following references are of record in the file of this patent:

UNITED STATES PATENTS

| Number | Name | Date |
|---|---|---|
| 491,445 | Pugh | Feb. 7, 1893 |
| 625,739 | Buerk | May 30, 1899 |
| 1,242,698 | Jacobs | Oct. 9, 1917 |
| 1,969,067 | Freeman | Aug. 7, 1934 |
| 1,977,108 | Arnberg | Oct. 16, 1934 |
| 2,041,356 | Kraft | May 19, 1936 |
| 2,092,720 | Urquhart | Sept. 7, 1937 |
| 2,186,775 | Webb | Jan. 9, 1940 |
| 2,314,318 | Cunningham | Mar. 16, 1943 |
| 2,409,571 | Leguillon | Oct. 15, 1946 |